United States Patent

Umetsu et al.

[11] Patent Number: 6,075,114
[45] Date of Patent: Jun. 13, 2000

[54] LIQUID-CRYSTALLINE RESIN COMPOSITIONS AND MOLDINGS

[75] Inventors: Hideyuki Umetsu; Yoshiki Makabe, both of Nagoya; Toshihide Inoue, Ichinomiya, all of Japan

[73] Assignee: Toray Industries, Inc., Japan

[21] Appl. No.: 09/091,435

[22] PCT Filed: Apr. 16, 1998

[86] PCT No.: PCT/JP98/01747

§ 371 Date: Jun. 29, 1998

§ 102(e) Date: Jun. 29, 1998

[87] PCT Pub. No.: WO98/49232

PCT Pub. Date: Nov. 5, 1998

[30] Foreign Application Priority Data

Apr. 25, 1997 [JP] Japan ................................... 9-109906

[51] Int. Cl.[7] .................................................. C08G 63/02
[52] U.S. Cl. ......................... 528/272; 528/183; 528/193; 528/194; 528/271

[58] Field of Search ..................................... 528/183, 193, 528/194, 271, 272

[56] References Cited

FOREIGN PATENT DOCUMENTS

| | | |
|---|---|---|
| 54-4983 | 3/1979 | Japan . |
| 6-299050 | 10/1994 | Japan . |
| 7-133407 | 5/1995 | Japan . |
| 8-53605 | 2/1996 | Japan . |

*Primary Examiner*—Terressa M. Boykin
*Attorney, Agent, or Firm*—Austin R. Miller

[57] ABSTRACT

A liquid-crystalline resin composition comprising 100 parts by weight of a semi-aromatic liquid-crystalline polyester and/or a semi-aromatic liquid-crystalline polyester-amide, from 0.001 to 5 parts by weight of at least one or more compounds selected from phosphorous acid, hypophosphorous acid and their salts, and from 0.01 to 10 parts by weight of red phosphorus has good flame retardancy, low anisotropy, good heat resistance and good hydrolysis resistance, and is useful as engineering plastic.

13 Claims, No Drawings

LIQUID-CRYSTALLINE RESIN COMPOSITIONS AND MOLDINGS

TECHNICAL FIELD

The present invention relates to improvements in liquid-crystalline resins, more precisely, to liquid-crystalline resin compositions and moldings with increased flame retardancy, lowered anisotropy, increased heat resistance and increased hydrolysis resistance.

BACKGROUND ART

There is increasing a great demand for high-quality plastics in these days, and a large number of polymers having various novel characteristics have been developed and put on the market. Of those, optically-anisotropic, liquid-crystalline polymers characterized by the parallel orientation of molecular chains are specifically noticed, as having high fluidity and good mechanical properties. In particular, as the polymers of those types have especially high stiffness, there is much increasing a great demand for small-sized moldings of the polymers in the field of electrical engineering and electronics and also in the field of office appliances.

Known are liquid-crystalline polymers as obtained by copolymerization of p-hydroxybenzoic acid with polyethylene terephthalate (Japanese Patent Publication (JP-B) Sho-56-18016); liquid-crystalline polymers as obtained by copolymerization of p-hydroxybenzoic acid with 4,4'-dihydroxybiphenyl, t-butylhydroquinone and terephthalic acid (Japanese Patent Application Laid-Open (JP-A) Sho-62-164719); liquid-crystalline polymers as obtained by copolymerization of p-hydroxybenzoic acid with 4,4'-dihydroxybiphenyl, isophthalic acid and terephthalic acid (JP-B Sho-57-24407, JP-A Sho-60-25046); liquid-crystalline polymers as obtained by copolymerization of p-hydroxybenzoic acid with 6-hydroxy-2-naphthoic acid (JP-A Sho-54-77691), etc.

However, as having a higher melting point than ordinary polyesters such as polyethylene terephthalate and polybutylene terephthalate, those liquid-crystalline polymers are problematic in that they are colored or thermally deteriorated to have lowered mechanical characteristics during polymerization to prepare them or during molding them. To solve this problem, a method has been proposed of adding a heat stabilizer of, for example, organic phosphorus compounds, hindered phenols and the like to the monomers being polymerized to thereby improve long-lasting heat resistance of the polymers.

It is known that liquid-crystalline polymers generally have flame retardancy, and, when exposed to direct flames, they are self-foamed to form carbide layers.

However, it has been found that typical liquid-crystalline polyesters as obtained by copolymerizing a polyester, which is derived from an alkylene glycol and a dicarboxylic acid, with an acyloxylated, aromatic carboxylic acid (for example, polymers described in JP-B Sho-56-18016) have poor flame retardancy when they are in the form of thin moldings (thickness: 0.8 mm).

As one means of imparting flame retardancy to the polymers described in JP-B Sho-56-18016, known is a method of combining the polymers with an organic bromine compound and an antimony compound (JP-A Hei-1-118567). However, this method is problematic in that the resulting polymers produce much smoke when they are fired.

Given that situation, recently, it has become strongly desired to use flame retardants containing no halogen at all, in order to overcome the drawbacks of such halogen-containing flame retardants.

As other means of making the above-mentioned polymers resistant to flames without using halogen-containing flame retardants, known are a method of copolymerizing the polymers with a phosphorus compound (JP-A Hei-3-134021); and a method of adding red phosphorus to semi-aromatic liquid-crystalline polyesters such as those comprising ethylene terephthalate units and p-hydroxybenzoic acid residue units (JP-A Hei-6-299050).

However, the heat-resisting agents described in JP-B Hei-2-51524 are not always effective for improving the heat stability of polymers and for preventing polymers from being thermally deteriorated; and the method described in JP-A Hei-3-134021 could not produce copolymers with good heat resistance. It has been found that the flame-retardant resin composition comprising a semi-aromatic polyester, which is described in JP-AHei-3-137154, is problematic not only in that its heat resistance and fluidity during molding is poor but also in that, in the UL94 test for flame retardancy, its moldings having a thickness of 0.8 mm had a degree of flame retardancy of V-0 but its moldings having a smaller thickness had poor flame retardancy.

Accordingly, the subject matter of the present invention is to obtain a resin composition and its moldings which are free from the problems noted above, which, even though being thin, still have good flame retardancy, which have good thermal characteristics including good residence stability and good dry-heat resistance during molding, and which additionally have novel characteristics including hydrolysis resistance, etc.

DISCLOSURE OF THE INVENTION

The first aspect of the invention is a liquid-crystalline resin composition comprising 100 parts by weight of a semi-aromatic liquid-crystalline polyester and/or a semi-aromatic liquid-crystalline polyester-amide, from 0.001 to 5 parts by weight of at least one or more compounds selected from phosphorous acid, hypophosphorous acid and their salts with a metal of Group I or Group II, and from 0.01 to 10 parts by weight of red phosphorus.

The second aspect of the invention is a liquid-crystalline resin composition comprising a semi-aromatic liquid-crystalline polyester and/or a semi-aromatic liquid-crystalline polyester-amide, and other substances, which has a phosphorus content of from 0.01 to 15% by weight, and a Group I and/or Group II metal content of from 5 to 15000 ppm, the ratio of the phosphorus content (a) to the Group I or Group II metal content (b), (a) / (b), being not smaller than 1.5.

The third aspect of the invention is a method for producing a liquid-crystalline resin composition, comprising adding to a semi-aromatic liquid-crystalline polyester and/or a semi-aromatic liquid-crystalline polyester-amide, at least one or more compounds of phosphorous acid, hypophosphorous acid and their metal salts in an amount of from 0.001 to 5 parts by weight relative to 100 parts by weight of said semi-aromatic liquid-crystalline polyester and/or semi-aromatic liquid-crystalline polyester-amide before the completion of the polymerization to give said semi-aromatic liquid-crystalline polyester and/or semi-aromatic liquid-crystalline polyester-amide, and adding thereto red phosphorus in an amount of from 0.01 to 10 parts by weight relative to the same after the completion of the polymerization.

The fourth aspect of the invention is a molding of the composition of the first or second aspect noted above.

BEST MODES OF CARRYING OUT THE INVENTION

The liquid-crystalline resin composition of the invention contains a semi-aromatic liquid-crystalline polyester and/or a semi-aromatic liquid-crystalline polyester-amide, of which the semi-aromatic liquid-crystalline polyester and/or semi-aromatic liquid-crystalline polyester-amide content is preferably not smaller than 30% by weight, more preferably not smaller than 50% by weight, even more preferably larger than a half of the composition.

The semi-aromatic liquid-crystalline polyester and/or semi-aromatic liquid-crystalline polyester-amide to be used in the invention includes (liquid-crystalline) polyesters and/or polyester-amides containing both aromatic group-having structural units and non-aromatic group-having structural unit and capable of forming an anisotropic melt phase. For example, mentioned are semi-aromatic liquid-crystalline polyesters comprising structural units as selected from aromatic oxycarbonyl units, aromatic dioxy units, aromatic dicarbonyl units, ethylene-dioxy units and the like, and capable of forming an anisotropic melt phase; and semi-aromatic liquid-crystalline polyester-amides comprising the above-mentioned structural units and structural units as selected from aromatic iminocarbonyl units, aromatic diimino units, aromatic iminoxy units and the like, and capable of forming an anisotropic melt phase.

As examples of the semi-aromatic liquid-crystalline polyesters capable of forming an anisotropic melt phase, mentioned are those comprising the following (I), (II), (III) and (IV), and those having structural units of the following (I), (III) and (IV). One or more of those polyesters are used in the invention.

(I)

(II)

(III)

(IV)

wherein $R_1$ represents one or more groups selected from the following:

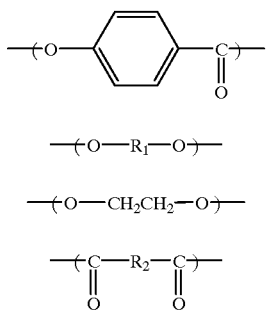

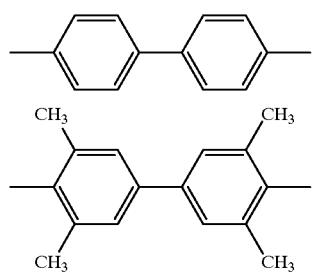

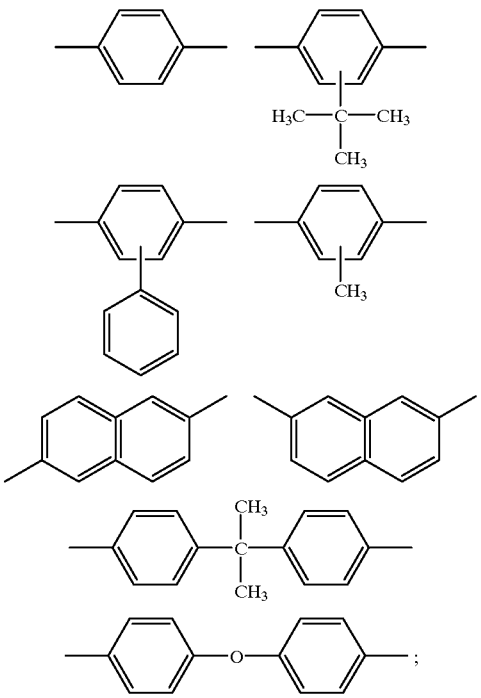

$R_2$ represents one or more groups selected from the following:

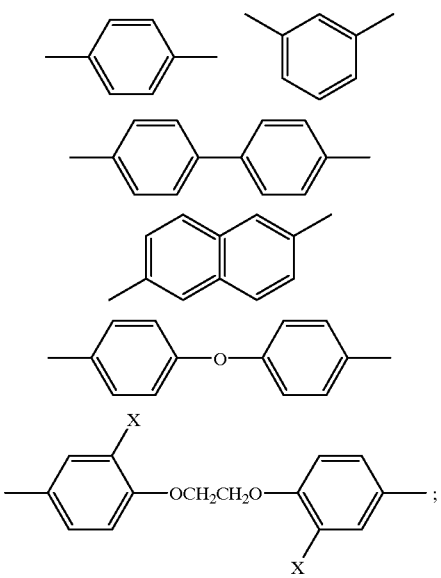

X represents a hydrogen atom or a chlorine atom.

In those polyesters, it is desirable that the total of the structural units (II) and (III) is substantially equimolar to the structural units (IV).

The structural unit (I) is derived from p-hydroxybenzoic acid; the structural unit (II) is from an aromatic dihydroxy compound selected from 4,4'-dihydroxybiphenyl, 3,3',5,5'-tetramethyl-4,4'-dihydroxybiphenyl, hydroquinone, t-butylhydroquinone, phenylhydroquinone, methylhydroquinone, 2,6-dihydroxynaphthalene, 2,7-dihydroxynaphthalene, 2,2-bis(4-hydroxyphenyl)propane and 4,4'-dihydroxydiphenyl ether; the structural unit (III) is from ethylene glycol; and the structural unit (IV) is from an aromatic dicarboxylic acid selected from terephthalic acid, isophthalic acid, 4,4'-diphenyldicarboxylic acid, 2,6-naphthalene-dicarboxylic acid, 1,2-bis(phenoxy)ethane-4,4'-dicarboxylic acid, 1,2-bis(2-chlorophenoxy)ethane-4,4'-dicarboxylic acid and 4,4'-diphenyl ether-dicarboxylic acid.

Of those, especially preferred are polyesters where $R_1$ is

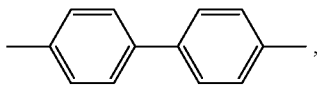

and $R_2$ is

As examples of the semi-aromatic liquid-crystalline polyester-amides, mentioned are those formed from p-hydroxybenzoic acid, 4,4'-dihydroxybiphenyl, terephthalic acid, p-aminobenzoic acid and polyethylene terephthalate (see JP-A Sho-64-33123).

Preferred semi-aromatic liquid-crystalline polyesters for use in the invention are the copolymers comprising the structural units (I), (III) and (IV), and the copolymers comprising the structural units (I), (II), (III) and (IV), in which the copolymerizing ratio of those units (I), (II), (III) and (IV) may be freely defined. However, in view of the fluidity of the copolymers, the copolymerizing ratio is preferably as follows:

In the copolymers containing (II), the total of the structural units (I) and (II) is preferably from 60 to 95 mol %, more preferably from 75 to 93 mol % of the total of the structural units (I), (II) and (III), in view of the heat resistance, the flame retardancy and the mechanical characteristics of the copolymers. The structural units (III) are preferably from 5 to 40 mol %, more preferably from 7 to 25 mol % of the total of the structural units (I), (II) and (III). The molar ratio of the structural units (I) to (II), (I)/(II), is preferably from 75/25 to 95/5, more preferably from 78/22 to 93/7, in view of the balance of the heat resistance and the fluidity of the copolymers. The structural units (IV) are substantially equimolar to the total of the structural units (II) and (III).

In the copolymers not containing (II), the structural units (I) are preferably from 30 to 80 mol %, more preferably from 45 to 75 mol % of the total of (I), (III) and (IV).

To prepare polycondensates of those semi-aromatic liquid-crystalline polyesters and semi-aromatic liquid-crystalline polyester-amides that are preferably used in the invention, the components to give the structural units (I) to (IV) may be copolymerized with any other components of, for example, aromatic dicarboxylic acids such as 3,3'-diphenyldicarboxylic acid, 2,2'-diphenyldicarboxylic acid, etc.; aliphatic dicarboxylic acids such as adipic acid, azelaic acid, sebacic acid, dodecane-dicarboxylic acid, etc.; alicyclic dicarboxylic acids such as hexahydroterephthalic acid, etc.; aromatic diols such as chlorohydroquinone, methylhydroquinone, 4,4'-dihydroxydiphenylsulfone, 4,4'-dihydroxydiphenylsulfide, 4,4'-dihydroxybenzophenone, etc.; aliphatic and alicyclic diols such as propylene glycol, 1,4-butanediol, 1,6-hexanediol, neopentyl glycol, 1,4-cyclohexanediol, 1,4-cyclohexane-dimethanol, etc.; aromatic hydroxycarboxylic acids such as m-hydroxybenzoic acid, 2,6-dihydroxynaphthoic acid, etc.; and p-aminophenol, within the range not interfering with the liquid-crystalline property of the resulting polycondensates.

Methods for producing the semi-aromatic liquid-crystalline polyesters and semi-aromatic liquid-crystalline polyester-amides for use in the invention are not specifically defined, and the polyesters and polyester-amides can be produced in accordance with any known polycondensation methods for producing conventional semi-aromatic liquid-crystalline polyesters and semi-aromatic liquid-crystalline polyester-amides.

For example, to produce the preferred semi-aromatic liquid-crystalline polyesters noted above, the following methods are preferred.

(1) Deacetylating polycondensation of p-acetoxybenzoic acid, a diacylated, aromatic dihydroxy compound such as 4,4'-diacetoxybiphenyl, diacetoxybenzene or the like, an aromatic dicarboxylic acid such as terephthalic acid or the like, and a polymer or oligomer of a polyester such as polyethylene terephthalate or the like, or a bis(β-hydroxyethyl) ester of an aromatic dicarboxylic acid such as bis(β-hydroxyethyl) terephthalate or the like.

(2) Deacetylating polycondensation of p-hydroxybenzoic acid, an aromatic dihydroxy compound such as 4,4'-dihydroxybiphenyl, hydroquinone or the like, acetic anhydride, an aromatic dicarboxylic acid such as terephthalic acid or the like, and a polymer or oligomer of a polyester such as polyethylene terephthalate or the like, or a bis(β-hydroxyethyl) ester of an aromatic dicarboxylic acid such as bis(β-hydroxyethyl) terephthalate or the like.

The polycondensation may be effected in the absence of a catalyst, for which, however, usable is a metal compound such as stannous acetate, tetrabutyl titanate, potassium acetate, sodium acetate, antimony trioxide or the like, or even a metal of magnesium.

The logarithmic viscosity of the semi-aromatic liquid-crystalline polyester and/or semi-aromatic liquid-crystalline polyester-amide for use in the invention can be measured in pentafluorophenol, which is preferably not smaller than 0.3 when measured therein at a concentration of 0.1 g/dl at 60° C. More preferably, it is from 0.5 to 10.0 dl/g.

The melt viscosity of the semi-aromatic liquid-crystalline polyester and/or semi-aromatic liquid-crystalline polyester-amide for use in the invention is preferably from 10 to 20,000 poises, more preferably from 20 to 10,000 poises.

The melt viscosity is measured, using a vertical flow tester, at a temperature of the melting point of the polymer sample (Tm) +10° C. and at a shear rate of 1,000 $sec^{-1}$.

The meltingpoint (Tm) is measured through differential calorimetry, in which the polymer sample having been at room temperature is first heated at a heating rate of 20° C./min to measure the temperature of the heat absorption peak (Tm1), then kept at a temperature of Tm1+20° C. for 5 minutes, then cooled down to room temperature at a cooling rate of 20° C./min, and thereafter again heated at a heating rate of 20° C./min to measure the temperature of the heat absorption peak (Tm2). The temperature Tm2 thus measured indicates the melting point of the sample.

The liquid-crystalline resin composition of the invention has good and improved flame retardancy, heat resistance and hydrolysis resistance, only when the phosphorus content of the composition is from 0.01 to 15% by weight, the amount of one or more metals selected from metals of Group I and metals of Group II in the composition (hereinafter referred to as "the Group I and/or Group II metal content of the composition", which indicates the overall amount of Group I metal and Group II metal, if any, in the composition) is from 5 to 15000 ppm, and the ratio of the phosphorus content (a) to the Group I and/or Group II metal content (b), (a)/(b), is not smaller than 1.5. The phosphorus content is from 0.01 to 15% by weight, but preferably from 0.03 to 10% by weight, more preferably from 0.06 to 8% by weight. The Group I and/or Group II metal content is from 5 to 15000 rpm, but preferably from 10 to 12000 rpm, more preferably from 50 to 10000 ppm. The ratio of the phosphorus content (a) to the Group I and/or Group II metal content (b), (a)/(b), is preferably not smaller than 5. If the phosphorus content of the composition is too small, the flame retardancy of the composition could not be improved; but if too large, the physical properties thereof will be lowered and, in addition, too much phosphorus will act as a combustion promoter.

In general, the phosphorus component may be incorporated into the composition by adding a phosphorus-containing compound to the semi-aromatic liquid-crystalline polyester and/or semi-aromatic liquid-crystalline polyester-amide to be in the composition. The phosphorus-containing compound preferably used in the invention includes, for example, phosphorous acid, hypophosphorous acid, their metal salts and the like, and even red phosphorus. Especially preferred are red phosphorus, Group I metal salts of phosphorous acid, and Group I metal salts of hypophosphorous acid.

The Group I and/or Group II metal component may be incorporated into the composition, for example, by adding thereto a metal-containing compound selected from metal salts of phosphorous acid and hypophosphorous acid noted above, such as Group I metal salts of phosphorous acid, Group II metal salts of phosphorous acid, Group I metal salts of hypophosphorous acid, Group II metal salts of hypophosphorous acid, etc.; Group I metal salts except phosphites and hypophosphites; Group II metal salts except phosphites and hypophosphites; Group I metal hydroxides usable for coating red phosphorus; Group II metal hydroxides usable for coating red phosphorus; Group I metal oxides usable as stabilizers for red phosphorus; Group II metal oxides usable as stabilizers for red phosphorus, etc.

As examples of metals of Group I and/or Group II, preferred are lithium, sodium, potassium, magnesium, potassium, barium, etc. If the Group I and/or Group II metal content of the composition is too small, it could not exhibit the effect of improving the heat resistance and the hydrolysis resistance of the composition; but if too large, the mechanical properties of the composition will be poor.

To measure the phosphorus content and the Group I and/or Group II metal content of the polymer of the invention, calibration curves of those components are previously prepared using fluorescent X-rays, and, on the basis of the thus-prepared calibration curves, the intended contents may be obtained.

Phosphorous acid, hypophosphorous acid and their metal salts to be added to the liquid-crystalline resin composition of the invention are at least one or more compounds selected from phosphorous acid, hypophosphorous acid and their metal salts. The metal to form those metal phosphites and metal hypophosphites is preferably an alkali metal (Group I metal) such as lithium, sodium, potassium, etc.; or an alkaline earth metal (Group II metal) such asmagnesium, calcium, barium, etc. More preferred are alkali metals. Concretely, the salts include calcium hypophosphite, magnesium hypophosphite, barium hypophosphite, sodium hypophosphite, potassium hypophosphite, potassium phosphite, magnesium phosphite, barium phosphite, sodium phosphite, etc. Most preferred are sodium salts, such as sodium hypophosphite, sodium phosphite, etc.

The amount of phosphorus acid, hypophosphorous acid and their metal salts to be added may be generally from 0.001 to 5 parts by weight, but preferably from 0.01 to 3 parts by weight, relative to 100 parts by weight of the semi-aromatic liquid-crystalline polyester and/or liquid-crystalline polyester-amide, in view of the effect of the additive component for improving the heat resistance and the hydrolysis resistance of the composition and of the mechanical properties of the composition.

Regarding the time at which phosphorus acid, hypophosphorous acid and their metal salts are added to the composition, they may be added anytime before or after the completion of the polymerization to give the liquid-crystalline polyester or liquid-crystalline polyester-amide, but are preferably added before the completion of the polymerization not after the completion thereof, as their effect to improve the heat resistance and the hydrolysis resistance of the composition is great. To add the additive component to the composition before the completion of the polymerization to give the polymer, employable is a simple method of adding it to raw materials that gave the liquid-crystalline polyester of liquid-crystalline polyester-amide in the stage of polymerizing the materials.

Any of solids of phosphorous acid, hypophosphorous acid and their metal salts, or liquids thereof at a temperature of their melting point or higher may be added to the raw materials or to the composition. Solutions of phosphorous acid, hypophosphorous acid and their metal salts may be added thereto, when they are mixed at low temperatures.

In order to further improve the residence stability of the composition, any other metal salts except phosphites and hypophosphites may be added to the composition. As the metal salts except phosphites and hypophosphites, employable are any of organic or inorganic ones, but preferred are alkali metal salts and alkaline metal salts of sulfuric acid, hydrohalogenic acids, nitric acid, boric acid, phosphoric acid, pyrophosphoric acid, acetic acid, oxalic acid, benzoic acid, etc. More concretely, usable are metal salts such as potassium sulfate, sodium acetate, barium acetate, magnesium acetate, sodium benzoate, sodium hydrogenphosphate, etc.

The amount of the metal salts except phosphites and hypophosphites to be added is preferably from 0.001 to 5 parts by weight, more preferably from 0.01 to 3 parts by weight, relative to 100 parts by weight of the semi-aromatic liquid-crystalline polyester and/or semi-aromatic liquid-crystalline polyester-amide.

Any of solids of those metal salts except phosphites and hypophosphites, or liquids thereof at a temperature of their melting point or higher may be added to the composition. Solutions of those metal salts may be added thereto, when they are mixed at low temperatures.

Red phosphorus may be added to the liquid-crystalline resin composition of the invention. As being unstable and gradually dissolving in water by itself, red phosphorus for use in the invention is preferably so processed that its negative properties are masked. To process red phosphorus for that purpose, for example, employable is any of a method of adding a minor amount of aluminium hydroxide or magnesium hydroxide to red phosphorus to thereby catalytically prevent the oxidation of red phosphorus; a method of coating red phosphorus with paraffin or wax to thereby inhibit the contact of red phosphorus with water; a method of mixing red oxide with ε-caprolactam or trioxan to thereby stabilize it; a method of coating red oxide with a thermosetting resin of, for example, phenolic resins, melamine resins, epoxy resins, unsaturated polyester resins and the like, to thereby stabilize it; a method of processing red with an aqueous solution of a metal salt of, for example, copper, nickel, silver, iron, aluminium, titanium or the like to thereby form a precipitate of the metal-phosphorus compound on the surface of red phosphorus to stabilize it; a method of coating red phosphorus with an alkali metal or alkaline earth metal hydroxide, such as magnesium hydroxide or the like, or with any other metal hydroxide such as titanium hydroxide, zinc hydroxide or the like; a method of coating the surface of red phosphorus with iron, cobalt, nickel, manganese, tin or the like through electroless plating to thereby stabilize it; or a combination of those methods. Of those, preferred are the method of coating red oxide with a thermosetting resin of, for example, phenolic resins, melamine resins, epoxy resins, unsaturated polyester resins and the like, to thereby stabilize it; and the method of coating red phosphorus with aluminium hydroxide, magnesium hydroxide, titanium hydroxide, zinc hydroxide or the like to thereby stabilize it. Especially preferred is the method of coating red phosphorus with a phenolic resin or titanium hydroxide.

The mean grain size of red phosphorus is, before it is added to the liquid-crystalline resin, preferably from 0.01 to 50 μm, more preferably from 0.1 to 45 μm, in view of the flame retardancy, the mechanical strength and the surface appearance of the moldings to be obtained.

The electroconductivity of red phosphorus for use in the invention is, after it has been extracted in hot water, may be generally from 0.1 to 1000 μS/cm, but preferably from 0.1 to 800 μS/cm, more preferably from 0.1 to 500 μS/cm, in view of the flame retardancy, the moisture resistance, the mechanical strength, the anti-tracking property and the non-coloring property of the moldings to be obtained. (The electroconductivity is obtained by adding 100 ml of pure water to 5 g of red phosphorus, extracting it in an autoclave at 121° C. for 100 hours, filtering it, and diluting the resulting filtrate to be 250 ml. The electroconductivity of the resulting dilution is measured.)

The amount of phosphine to be generated by red phosphorus for use in the invention (phosphine generation by red phosphorus) is generally not larger than 100 ppm, but preferably not higher than 50 ppm, more preferably not higher than 20 ppm, in view of the amount of gas to be generated by the composition, the stability of the composition being molded, the mechanical strength of the melt of the composition during the residence time, the outward appearance of the moldings formed, and the corrosion of terminals by the moldings. (The phosphine generation is obtained by putting 5 g of red phosphorus into a 500 ml-container having been purged with nitrogen, such as a test tube, degassing the container to be at 10 mmHg, heating it at 280° C. for 10 minutes, then cooling it to be at 25° C., diluting the gas in the container (test tube) with nitrogen gas to be at 760 mmHg, and measuring the phosphine content by the use of a phosphine (hydrogen phosphide) detector. The phosphine generation is represented by the equation of phosphine generation (ppm)=detector value (ppm)×degree of dilution.)

As commercial products of red phosphite, of which the grain size, the electroconductivity and the phosphine generation are all within the preferred ranges noted above, mentioned are "Novaexcell 140" and "Novaexcell F5" manufactured by Rin Kagaku Kogyo KK.

The amount of red phosphorus to be added to the composition is generally from 0.01 to 10 parts by weight, but preferably from 0.05 to 5 parts by weight, more preferably from 0.06 to 1 part by weight, even more preferably from 0.08 to 0.5 parts by weight, further preferably from 0.1 to 0.3 parts by weight, relative to 100 parts by weight of the semi-aromatic liquid-crystalline polyester and/or semi-aromatic liquid-crystalline polyester-amide. If its amount is too small, red phosphorus could not exhibit its flame-retarding ability; but if too large, the physical properties of the composition are lowered and, in addition, too much red phosphorus added will act as a combustion promoter rather than acting for flame retardation.

A metal oxide acting as a stabilizer for red phosphorus may be added to the liquid-crystalline resin composition of the invention, whereby the stability and the strength of the composition being extruded and molded, as well as the heat resistance of the composition, and even the terminal corrosion resistance of the moldings of the composition may be further improved. Specific examples of the metal oxide include cadmiumoxide, zincoxide, cuprousoxide, cupricoxide, ferrous oxide, ferric oxide, cobalt oxide, manganese oxide, molybdenum oxide, tin oxide, titanium oxide, etc. Of those, preferred are metal oxides except those of Group I and/or Group II metals, such as cadmium oxide, cuprous oxide, cupric oxide, titanium oxide, etc. More preferred are cuprous oxide, cupric oxide and titanium oxide. However, Group I and/or Group II metal oxides are also employable. Most preferred is titanium oxide, in order to much more improve the stability and the strength of the composition being extruded and molded, the heat resistance of the composition, the terminal corrosion resistance of the moldings of the composition, and even the non-coloring property of the composition.

The amount of the metal oxide to be added is preferably from 0.01 to 20 parts by weight, more preferably from 0.1 to 10 parts by weight, relative to 100 parts by weight of the semi-aromatic liquid-crystalline polyester and/or semi-aromatic liquid-crystalline polyester-amide, in view of the mechanical properties and the moldability of the composition.

A fluorine resin may be added to the liquid-crystalline resin composition of the invention, in order to much more improve the flame retardancy of thin moldings of the composition. The fluorine resin includes, for example, polytetrafluoroethylenes, polyhexafluoropropylenes, (tetrafluoroethylene/hexafluoropropylene) copolymers, (tetrafluoroethylene/perfluoroalkyl vinyl ether) copolymers, (tetrafluoroethylene/ethylene) copolymers, (hexafluoropropylene/propylene) copolymers, polyvinylidene fluorides, (vinylidene fluoride/ethylene) copolymers, etc. Of those, preferred are polytetrafluoroethylenes, (tetrafluoroethylene/perfluoroalkyl vinyl ether) copolymers, (tetrafluoroethylene/hexafluoropropylene) copolymers, (tetrafluoroethylene/ethylene) copolymers, and polyvinylidene fluorides; and more preferred are polytetrafluoroethylenes and (tetrafluoroethylene/ethylene) copolymers.

The amount of the fluorine resin to be added is generally from 0.01 to 10 parts by weight, but preferably from 0.1 to 5 parts by weight, more preferably from 0.2 to 3 parts by weight, relative to 100 parts by weight of the semi-aromatic liquid-crystalline polyester and/or semi-aromatic liquid-crystalline polyester-amide, in view of the mechanical properties and the moldability of the composition.

To add red phosphorus to the composition of the invention, preferably employed is a method of adding red phosphorus alone and/or along with any other filler, after the completion of the polymerization to give the semi-aromatic liquid-crystalline polyester and/or semi-aromatic liquid-crystalline polyester-amide, by mixing them in melt. For mixing them in melt, employable is any conventional method. For example, used is any of Bumbury mixers, rubber rollers, kneaders, single-screw or double-screw extruders, etc., and the components are melted and kneaded therein at a temperature falling between 200 and 370° C. to give the composition. Preferably used is a double-screw extruder having one or more kneading zones.

The filler for use in the invention is not specifically defined, and any of fibrous, tabular, powdery or granular fillers are employable herein. The composition containing the filler is much more improved to have higher strength, stiffness and heat resistance, and, in addition, the composition is prevented from being shrunk while it is formed into moldings, and the moldings, if fired, do not give drops of polymer melt. Concretely, the filler includes fibrous or whisker-like fillers, for example, glass fibers, carbon fibers of PAN, pitch or the like, metal fibers such as stainless steel fibers, aluminium fibers, brass fibers, etc., organic fibers such as aromatic polyamide fibers, etc., as well as gypsum fibers, ceramic fibers, asbestos fibers, zirconia fibers, alumina fibers, silica fibers, titanium oxide fibers, silicon carbide fibers, rock wool, potassium titanate whiskers, barium titanate whiskers, aluminium borate whiskers, silicon nitride whiskers, etc.; and also other powdery, granular or tabular fillers of, for example, mica, talc, kaolin, silica, calcium carbonate, glass beads, glass flakes, glass microballoons, clay, molybdenum disulfide, wollastonite, titanium oxide, zinc oxide, calcium polyphosphate, graphite, etc. Of those fillers, preferred are glass fibers. The type of glass fibers for use in the invention is not specifically defined, and any and every one to be generally used for reinforcing resins is employable herein. For example, they may be selected from long-fiber type or short-fiber type, chopped strands and milled fibers, etc. Two or more of those fillers may be used in combination. The fillers for use in the invention may be surface-treated with any known coupling agents (e.g., silane coupling agents, titanate coupling agents, etc.) or any other surface-treating agents.

Glass fibers for use in the invention may be coated with a thermoplastic resin such as ethylene/vinyl acetate copolymer or the like, or with an epoxy resin or the like, or may be bundled up therewith.

The amount of the filler to be added may be not larger than 200 parts by weight, but preferably from 10 to 200 parts by weight, more preferably from 20 to 150 parts by weight, relative to 100 parts by weight of the liquid-crystalline resin composition to which have been added at least one or more compounds selected from phosphorous acid, hypophosphorous acid and their salts with Group I or Group II metals, and red phosphorus, etc.

The liquid-crystalline resin composition of the invention may contain a salt of cyanuric acid or isocyanuric acid with a triazine compound, which is to further improve the flame retardancy of thin moldings of the composition and to reduce the amount of smoke to be generated by moldings of the composition when they are fired.

The salt of cyanuric acid or isocyanuric acid with a triazine compound is an additive of cyanuric acid or isocyanuric acid a triazine compound added thereto. In general, the additive has a 1/1 (by mol) composition or, as the case may be, 1/2 (by mol) composition. Of triazine compounds, those not forming salts with cyanuric acid or isocyanuric acid shall be excluded.

Specific examples of the triazine compound for use in the invention include melamine, melem, benzoguanamine, acetoguanamine, 2-amido-4,6-diamino-1,3,5-triazine, mono (hydroxymethyl) melamine, di(hydroxymethyl) melamine, and tri(hydroxymethyl)melamine. Salts of those triazine compounds are usable in the invention. Preferred are melamine, melem, benzoguanamine and acetoguanamine; and especially preferred are melamine, benzoguanamine and acetoguanamine.

Salts of cyanuric acid or isocyanuric acid with triazine compounds are powdery, which are prepared by adding a mixture of cyanuric or isocyanuric acid and a triazine compound to water to form an aqueous slurry, well mixing it to form therein fine grains of a salt of the two, filtering the resulting slurry, and drying the residue. The salts differ from mere mixtures of the two. It is not always necessary that the salts are completely pure, but the salts may contain in some degree non-reacted triazine compounds, cyanuric acid and isocyanuric acid.

The mean grain size of the salt is, before it is added to the liquid-crystalline resin, preferably from 0.01 to 100 $\mu$m, more preferably from 10 to 80 $\mu$m, in view of the flame retardancy, the mechanical strength and the surface appearance of the moldings of the composition. If its dispersibility is poor, the salt may be combined with a dispersant such as tris($\beta$-hydroxyethyl) isocyanurate or the like.

The amount of the salt to be added may be generally from 0 to 50 parts by weight, but preferably from 0.1 to 40 parts by weight, more preferably from 0.5 to 30 parts by weight, relative to 100 parts by weight of the semi-aromatic liquid-crystalline polyester resin and/or semi-aromatic liquid-crystalline polyester-amide.

The liquid-crystalline resin composition of the invention may contain any ordinary additives, for example, antioxidants and heat stabilizers (e.g., hindered phenols, hydroquinones, phosphites and their substituents, etc.), ultraviolet absorbents (e.g., resorcinols, salicylates, benzotriazoles, benzophenones, etc.), lubricants and mold-release agents (e.g., montanic acid and its salts, esters and half-esters, stearyl alcohol, stearamides, polyethylene wax, etc.), colorants containing dye (e.g., Nigrosine, etc.) and pigment (e.g., cadmium sulfide, phthalocyanine, etc.), nucleating agents, plasticizers, antistatic agents, etc., and those additives may impart predetermined characteristics to the composition.

To add them to the composition, the additives are preferably kneaded with the composition in melt. For the melt-kneading, employable is any known method. For example, using any of Bumbury mixers, rubber rollers, kneaders, single-screw or double-screw extruders or the like, they are kneaded with the composition in melt at a temperature falling between 200 and 380° C.

Where phosphorous acid, hypophosphorous acid or its metal salt, and red phosphorus, and other optional additives are added to the polymer to prepare the composition of the invention, it is desirable that phosphorous acid, hypophosphorous acid or its metal salt is first added to the semi-aromatic liquid-crystalline polyester and/or semi-aromatic liquid-crystalline polyester-amide while the polymer is being formed through polymerization, and that, after the polymerization to give the polymer, red phosphorus and other optional additives are added to the polymer system, and kneading them in melt.

The resin composition thus obtained can be subjected to any ordinary molding of, for example, injection molding, extrusion molding, compression molding or the like to produce various moldings. The moldings are extremely useful as parts for electric and electronic appliances, parts for precision instruments, automobile parts, etc. In addition, as having excellent heat resistance and hydrolysis resistance, the composition may be formulated along with a colorant, and can be molded into excellent color moldings.

The composition and its moldings thus obtained have excellent heat resistance and excellent hydrolysis resistance, and have good color tone. Therefore, they can be worked into three-dimensional moldings, sheets, container pipes, etc. For example, they are useful as parts for electric and electronic appliances, such as typically various gears, various cases, sensors, LEP lamps, connectors, sockets, resistors, relay cases, switches, coil bobbins, capacitors, variable capacitor cases, optical pickups, oscillators, plates for various terminals, transformers, plugs, boards for printed circuits, tuners, speakers, microphones, headphones, small-sized motors, magnetic head bases, power modules, housings, semiconductors, liquid crystals, FDD carriages, FDD chassis, motor brush holders, parabolic antennas, computer-related parts, etc.; parts for electric appliances for household and office use, such as typically VTR parts, TV parts, irons, hair driers, rice cooker parts, microwave range parts, acoustic parts, parts for sound appliances including audios, laser discs, compact discs, etc., lighting parts, refrigerator parts, air conditioner parts, typewriter parts, word processor parts, etc.; office computer-related parts, telephone-related parts, facsimile-related parts, duplicator-related parts, washing tools; machine-related parts, such as typically various bearings including oilless bearings, stern bearings, underwater bearings, etc., motor parts, lighters, typewriters, etc.; optical instrument-related parts and precision instrument-related parts, such as typically parts for microscopes, binoculars, cameras, watches, etc.; automobile and vehicle-related parts, such as typically alternator terminals, alternator connectors, IC regulators, Light Dia potentiometer bases, various valves including exhaust gas valves, etc., various pipes for fuel-related intake and emission systems, air intake nozzle snorkels, intake manifolds, fuel pumps, engine-cooling water joints, carburetor main bodies, carburetor spacers, exhaust gas sensors, cooling water sensors, oil temperature sensors, brake pad wear sensors, throttle position sensors, crank shaft position sensors, air flow meters, thermostat bases for air conditioners, air flow control valves for heaters, brush holders for radiator motors, water pump impellers, turbine veins, wiper motor-related parts, distributors, starter switches, starter relays, wire harnesses for transmissions, windshield washer nozzles, air conditioner panel switch boards, coils for fuel-related electromagnetic valves, connectors for fuses, horn terminals, insulating boards for electric parts, step motor rollers, lamp sockets, lamp reflectors, lamp housings, brake pistons, solenoid bobbins, engine oil filters, ignition cases, etc. In addition to those, they have many other applications.

Above all, owing to their good heat resistance and good hydrolysis resistance, the moldings of the invention are favorably used for small-sized parts such as those of 5 cc or smaller in size. In particular, they are extremely favorable to practical use for small-sized built-in parts such as connectors for SIMM sockets and others, CD pickup lens holders, various small-sized gears, etc.

EXAMPLES

Now, the invention is described in more detail with reference to the following Examples, to which, however, the invention is not restricted without departing from the spirit and scope thereof.

Reference Example 1:
LCP1:
11.05 kg of p-hydroxybenzoic acid, 1.40 kg of 4,4'-dihydroxybiphenyl, 1.25 kg of terephthalic acid, 2.40 kg of polyethylene terephthalate having an intrinsic viscosity of about 0.6 dl/g, and 10.67 kg of acetic anhydride were put into a pressure container, and reacted therein in a nitrogen gas atmosphere at a temperature falling between 100 and 250° C., for 1.5 hours. Then, the container was degassed to have a reduced pressure of 66 Pa, at 315° C. over a period of 1 hour, in which the compounds were further reacted for 1.25 hours to complete polycondensation, whereupon a nearly theoretical amount of acetic acid was evaporated. Thus were obtained pellets composed of 80 molar equivalents of aromatic oxycarbonyl units, 7.5 molar equivalents of aromatic dioxy units, 12.5 molar equivalents of ethylenedioxy units and 20 molar equivalents of aromatic dicarboxylic acid units, and having a melting point of 314° C.

LCP2:
11.05 kg of p-hydroxybenzoic acid, 1.40 kg of 4,4'-dihydroxybiphenyl, 1.25 kg of terephthalic acid, 2.40 kg of polyethylene terephthalate having an intrinsic viscosity of about 0.6 dl/g, 10.38 kg of acetic anhydride, and 28.6 g of sodium hypophosphite were put into a pressure container, and polymerized therein under the same condition as that for LCP1. Obtained were pellets composed of 80 molar equivalents of aromatic oxycarbonyl units, 7.5 molar equivalents of aromatic dioxy units, 12.5 molar equivalents of ethylenedioxy units and 20 molar equivalents of aromatic dicarboxylic acid units, and having a melting point of 312° C.

LCP3:
11.01 kg of p-hydroxybenzoic acid, 1.40 kg of 4,4'-dihydroxybiphenyl, 1.25 kg of terephthalic acid, 3.84 kg of polyethylene terephthalate having an intrinsic viscosity of about 0.6 dl/g, 9.56 kg of acetic anhydride, and28.6 g of sodium phosphite were put into a pressure container, and polymerized therein under the same condition as that for LCP1. Obtained were pellets composed of 72.5 molar equivalents of aromatic oxycarbonyl units, 7.5 molar equivalents of aromatic dioxy units, 20 molar equivalents of ethylenedioxy units and 27.5 molar equivalents of aromatic dicarboxylic acid units, and having a melting point of 312° C.

LCP4:
11.05 kg of p-hydroxybenzoic acid, 1.40 kg of 4,4'-dihydroxybiphenyl, 1.25 kg of terephthalic acid, 2.40 kg of polyethylene terephthalate having an intrinsic viscosity of about 0.6 dl/g, 10.38 kg of acetic anhydride, and 57.2 g of sodium hypophosphite were put into a pressure container, and polymerized therein under the same condition as that for LCP1. Obtained were pellets composed of 80 molar equivalents of aromatic oxycarbonyl units, 7.5 molar equivalents of aromatic dioxy units, 12.5 molar equivalents of ethylenedioxy units and 20 molar equivalents of aromatic dicarboxylic acid units, and having a melting point of 312° C.

LCP5:
11.05 kg of p-hydroxybenzoic acid, 1.49 kg of 4,4'-dihydroxybiphenyl, 1.33 kg of terephthalic acid, 2.31 kg of polyethylene terephthalate having an intrinsic viscosity of about 0.6 dl/g, and 10.78 kg of acetic anhydride were put into a pressure container, and reacted therein in a nitrogen gas atmosphere at a temperature falling between 100 and 250° C., for 1.5 hours. Then, the container was degassed to have a reduced pressure of 66 Pa, at 325° C. over a period of 1 hour, in which the compounds were further reacted for 1.25 hours to complete polycondensation, whereupon a nearly theoretical amount of acetic acid was evaporated. Thus were obtained pellets composed of 80 molar equivalents of aromatic oxycarbonyl units, 8 molar equivalents of aromatic dioxy units, 12 molar equivalents of ethylenedioxy units and 20 molar equivalents of aromatic dicarboxylic acid units, andhaving a melting point of 319° C.

LCP6:

11.05 kg of p-hydroxybenzoic acid, 1.49 kg of 4,4'-dihydroxybiphenyl, 1.33 kg of terephthalic acid, 2.31 kg of polyethylene terephthalate having an intrinsic viscosity of about 0.6 dl/g, 10.49 kg of acetic anhydride, and 25 g of sodium hypophosphite were put into a pressure container, and polymerized therein under the same condition as that for LCP1. Obtained were pellets composed of 80 molar equivalents of aromatic oxycarbonyl units, 8 molar equivalents of aromatic dioxy units, 12 molar equivalents of ethylenedioxy units and 20 molar equivalents of aromatic dicarboxylic acid units, and having a melting point of 315° C.

LCP7:

10.70 kg of p-hydroxybenzoic acid, 1.40 kg of 4,4'-dihydroxybiphenyl, 1.25 kg of terephthalic acid, 2.88 kg of polyethylene terephthalate having an intrinsic viscosity of about 0.6 dl/g, 10.10 kg of acetic anhydride, and 32 g of sodium hypophosphite were put into a pressure container, and reacted therein in a nitrogen gas atmosphere at a temperature falling between 100 and 250° C., for 1.5 hours. Then, the container was degassed to have a reduced pressure of 66 Pa, at 290° C. over a period of 1 hour, in which the compounds were further reacted for 1.25 hours to complete polycondensation. Thus were obtained pellets composed of 77.5 molar equivalents of aromatic oxycarbonyl units, 7.5 molar equivalents of aromatic dioxy units, 15 molar equivalents of ethylenedioxy units and 22.5 molar equivalents of aromatic dicarboxylic acid units, and having a melting point of 281° C.

LCP8:

11.05 kg of p-hydroxybenzoic acid, 1.49 kg of 4,4'-dihydroxybiphenyl, 1.33 kg of terephthalic acid, 2.40 kg of polyethylene terephthalate having an intrinsic viscosity of about 0.6 dl/g, 10.49 kg of acetic anhydride, and 50 g of sodium hypophosphite were put into a pressure container, and polymerized therein under the same condition as that for LCP1. Obtained were pellets composed of 80 molar equivalents of aromatic oxycarbonyl units, 8 molar equivalents of aromatic dioxy units, 12 molar equivalents of ethylenedioxy units and 20 molar equivalents of aromatic dicarboxylic acid units, and having a melting point of 315° C.

LCP9:

11.05 kg of p-hydroxybenzoic acid, 2.04 kg of 4,4'-dihydroxybiphenyl, 1.83 kg of terephthalic acid, 1.73 kg of polyethylene terephthalate having an intrinsic viscosity of about 0.6 dl/g, 11.14 kg of acetic anhydride, and 29 g of sodium hypophosphite were put into a pressure container, and reacted therein in a nitrogen gas atmosphere at a temperature falling between 100 and 250° C., for 1.5 hours. Then, the container was degassed to have a reduced pressure of 66 Pa, at 335° C. over a period of 1 hour, in which the compounds were further reacted for 1.25 hours to complete polycondensation. Thus were obtained pellets composed of 80 molar equivalents of aromatic oxycarbonyl units, 11 molar equivalents of aromatic dioxy units, 9 molar equivalents of ethylenedioxy units and 20 molar equivalents of aromatic dicarboxylic acid units, and having a melting point of 330° C.

LCP10:

11.05 kg of p-hydroxybenzoic acid, 2.04 kg of 4,4'-dihydroxybiphenyl, 1.83 kg of terephthalic acid, 1.73 kg of polyethylene terephthalate having an intrinsic viscosity of about 0.6 dl/g, and 11.45 kg of acetic anhydride were put into a pressure container, and reacted therein in a nitrogen gas atmosphere at a temperature falling between 100 and 250° C., for 1.5 hours. Then, the container was degassed to have a reduced pressure of 66 Pa, at 335° C. over a period of 1 hour, in which the compounds were further reacted for 1.25 hours to complete polycondensation. Thus were obtained pellets composed of 80 molar equivalents of aromatic oxycarbonyl units, 11 molar equivalents of aromatic dioxy units, 9 molar equivalents of ethylenedioxy units and 20 molar equivalents of aromatic dicarboxylic acid units, and having a melting point of 336° C.

Samples prepared herein were measured and evaluated according to the methods mentioned below.

(1) Group I and/or Group II Metal Content, and Phosphorus Content:

Using Toshiba's IS-55EPN, each sample was molded into discs having a diameter of 30 mmφ and a thickness of 2 mm, at a cylinder temperature of being the melting point of the liquid-crystalline resin +15° C. and at a mold temperature of 90° C. The Group I and/or Group II metal content and the phosphorus content of each sample disc were obtained on the basis of the calibration curve that had been previously prepared from known samples using a fluorescent X-ray device RIX 1000 (manufactured by Rigaku Denki KK). (The data shown in Table 1 below are ones as corrected relative to the resin composition not containing the inorganic filler.)

(2) Residence Stability:

Using Sumitomo Ship Building and Machinery's Promat 25/40, prepared were test pieces for bending test (size: 127 mm×12.7 mm×3.12 mm), at a cylinder temperature of being the melting point of the resin sample +20° C. and at a mold temperature of 90° C. For those, the residence time was 4 minutes or 20 minutes. According to ASTM D790, the bending strength of each test piece was measured. The bending strength retention of each sample was obtained, which is represented by: (bending strength at retention time of 20 minutes)/(bending strength at retention time of 4 minutes)×100.

(3) Hydrolysis Test:

ASTM No. 1 test pieces for tensile test were prepared, using Toshiba's IS-55EPN, at a cylinder temperature of being the melting point of the liquid-crystalline resin +15° C. and at a mold temperature of 90° C. Each test piece was put into an autoclave along with water, and processed therein at 120° C. for 3 days. Then, the tensile strength of the thus-processed test piece was measured. The tensile.strength retention of each sample was obtained, which is represented by: (tensile strength after processed at 120° C. for 3 days)/(initial tensile strength)×100.

(4) Anisotropy:

Molded were square film gate plates of 70×70×1 mm thick, which were cut into pieces having a width of 12.7 mm, in the machine direction (MD) and in the transverse direction (TD). The modulus of bending elasticity of each piece was measured according to ASTM D790. The anisotropy of the sample was obtained, which is represented by MD/TD.

(5) Flame Retardancy:

Prepared were 1/64 inch test pieces for combustion test, through injection molding. These were subjectedto a vertical combustion test according to UL 94 Standard.

EXAMPLES 1 to 11

Comparative Examples 1 to 10

100 parts by weight of the liquid-crystalline polyester that had been prepared in Reference Example 1 was dry-blended with red phosphorus, "Novaexcell 140" or "Novaexcell F5", along with glass fibers, as in Table 1. ("Novaexcell 140" and "Novaexcell F5" were both commercial products of Rin Kagaku Kogyo KK, and the former had a mean grain size of 29.7μ and an electroconductivity of 200 μmS/cm, while the latter had a mean grain size of 4.5μ and an electroconductivity of 200 μmS/cm. The electroconductivity was measured as follows: 100 ml of pure water was added to 5 g of red phosphorus, which was then extracted in an autoclave at 121° C. for 100 hours, and filtered. The resulting filtrate was diluted to be 250 ml, and its electroconductivity was measured, using an conductivity meter, Personal SC Meter manufactured by Yokokawa Electric Co.) The mixture obtained was melt-kneaded at a temperature of being the melting point of the liquid-crystalline resin +15° C., and pelletized into pellets, using a 30 mmφ, double-screw extruder. The resulting pellets were applied to an injection-molding machine, Sumitomo Nestal Promat 40/25 (manufactured by Sumitomo Ship Building and Machinery Co.), of which the cylinder temperature was the melting point of the liquid-crystalline resin +15° C. and the mold temperature was 90° C., and formed into test pieces according to the methods mentioned above.

The test data obtained are shown in Table 1.

The data in Table 1 verify that the liquid-crystalline resin composition of the invention has good flame retardancy, low anisotropy, good heat resistance (indicated by the heat stability during the residence time), and good hydrolysis resistance.

TABLE 1

| | Liquid-crystalline Resin | Red Phosphorus (amount, wt. pts.) | Phosphorus Content of Polymer, wt. % | Group I and/or Group II Metal Content, ppm | Ratio of Phosphorus Content/Group I and/or Group II Metal Content | Inorganic Filler Metal Oxide |
|---|---|---|---|---|---|---|
| Example 1 | LCP2 | Novaexcell 140 (0.1) | 0.1460 | Na 420 | 3.47 | GF 50 wt. pts. |
| Example 2 | LCP3 | Novaexcell 140 (0.1) | 0.1420 | Na 400 | 3.55 | GF 50 wt. pts. |
| Example 3 | LCP4 | Novaexcell 140 (0.15) | 0.2610 | Na 810 | 3.22 | GF 50 wt. pts. |
| Example 4 | LCP2 | Novaexcell F5 (0.2) | 0.2250 | Na 420 | 5.36 | GF 50 wt. pts. |
| Example 5 | LCP2 | Novaexcell F5 (0.2) | 0.2240 | Na 420 | 5.33 | GF 50 wt. pts. Titanium Oxide 0.2 wt. pts. |
| Example 6 | LCP6 | Novaexcell 140 (0.2) | 0.2150 | Na 360 | 5.97 | GF 45 wt. pts. |
| Example 7 | LCP7 | Novaexcell 140 (0.2) | 0.2430 | Na 520 | 4.67 | GF 45 wt. pts. |
| Example 8 | LCP8 | Novaexcell 140 (0.3) | 0.3260 | Na 740 | 4.41 | GF 45 wt. pts. |
| Example 9 | LCP6 | Novaexcell F5 (0.25) | 0.2370 | Na 360 | 7.58 | GF 45 wt. pts. |
| Example 10 | LCP6 | Novaexcell F5 (0.25) | 0.2760 | Na 360 | 7.67 | GF 45 wt. pts. Titanium Oxide 0.2 wt. pts. |
| Example 11 | LCP9 | Novaexcell 140 (0.1) | 0.1350 | Na 430 | 3.14 | GF 45 wt. pts. |
| Comp. Example 1 | LCP1 | — | — | — | — | GF 50 wt. pts. |
| Comp. Example 2 | LCP1 | Novaexcell 140 (0.1) | 0.0935 | — | — | GF 50 wt. pts. |
| Comp. Example 3 | LCP2 | Novaexcell 140 (30) | 28.8700 | Na 300 | 962 | GF 50 wt. pts. |
| Comp. Example 4 | LCP3 | — | 0.0540 | Na 400 | 1.35 | GF 50 wt. pts. |
| Comp. Example 5 | LCP5 | — | — | — | — | GF 45 wt. pts. |
| Comp. Example 6 | LCP5 | Novaexcell 140 (0.2) | 0.1900 | — | — | GF 45 wt. pts. |
| Comp. Example 7 | LCP6 | Novaexcell 140 (25) | 23.1105 | Na 280 | 825 | GF 45 wt. pts. |
| Comp. Example 8 | LCP7 | — | 0.0700 | Na 520 | 1.35 | GF 45 wt. pts. |
| Comp. Example 9 | LCP9 | — | 0.0600 | Na 430 | 1.40 | GF 45 wt. pts. |
| Comp. Example 10 | LCP10 | Novaexcell 140 (0.1) | 0.084 | — | — | GF 45 wt. pts. |

| | Strength Retention for Residence Stability, % | Strength Retention for Hydrolysis Resistance, % | Anisotropy (MD/TD) | UL-94 |
|---|---|---|---|---|
| Example 1 | 93 | 84 | 3.3 | V-0 |
| Example 2 | 92 | 83 | 3.3 | V-0 |
| Example 3 | 93 | 82 | 3.2 | V-0 |
| Example 4 | 92 | 84 | 3.3 | V-0 |
| Example 5 | 93 | 84 | 3.2 | V-0 |
| Example 6 | 92 | 85 | 3.5 | V-0 |
| Example 7 | 93 | 81 | 3.2 | V-0 |
| Example 8 | 91 | 82 | 3.4 | V-0 |
| Example 9 | 92 | 84 | 3.5 | V-0 |
| Example 10 | 91 | 84 | 3.3 | V-0 |
| Example 11 | 96 | 87 | 3.7 | V-0 |
| Comparative Example 1 | 85 | 65 | 4.6 | V-2 |
| Comparative Example 2 | 60 | 40 | 4.6 | V-0 |
| Comparative Example 3 | 40 | 20 | 3.2 | V-2 |
| Comparative Example 4 | 94 | 85 | 3.3 | V-2 |
| Comparative Example 5 | 88 | 66 | 4.8 | V-2 |
| Comparative Example 6 | 80 | 42 | 4.8 | V-0 |
| Comparative Example 7 | 45 | 25 | 3.2 | V-2 |
| Comparative Example 8 | 92 | 81 | 3.4 | V-2 |
| Comparative Example 9 | 96 | 85 | 3.8 | V-2 |
| Comparative Example 10 | 88 | 66 | 4.9 | V-0 |

INDUSTRIAL APPLICABILITY

As being characterized by good flame retardancy, low anisotropy, good heat resistance and good hydrolysis resistance, the liquid-crystalline resin composition and its moldings of the invention are favorably used in electric and electronic-related appliances, precision machine-related instruments, office appliances, car and vehicle-related parts, etc., and have other various applications.

What is claimed is:

1. A liquid-crystalline resin composition comprising 100 parts by weight of a semi-aromatic liquid-crystalline compound selected from the group consisting of polyester and polyester-amide, from 0.001 to 5 parts by weight of at least one or more compounds selected from the group consisting of phosphorous acid and hypophosphorous acid and their salts with a metal selected from the group consisting of Group I and Group II metals, and from 0.01 to 10 parts by weight of red phosphorus.

2. A liquid-crystalline resin composition comprising a semi-aromatic liquid-crystalline compound selected from the group consisting of polyester and polyester-amide, which has a phosphorus content of from 0.01 to 15% by weight, and a metal selected from the group consisting of Group I and Group II metals in a content of from 5 to 15000 ppm, the ratio of said phosphorus content (a) to said metal content (b) being not smaller than 1.5.

3. The liquid-crystalline resin composition as claimed in claim 2, wherein said phosphorus content is derived from at least one or more compounds selected from the group consisting of phosphorous acid, hypophosphorous acid and their salts, and red phosphorus.

4. The liquid-crystalline resin composition as claimed in claim 2, wherein said metal component is derived from one or more metal-containing compounds selected from the group consisting of Group I and Group II metal salts of phosphorous acid, Group I and Group II metal salts of hypophosphorous acid, and Group I and Group II metal salts of compounds except phosphorous acid and hypophosphorous acid.

5. The liquid-crystalline resin composition as claimed in claim 1, wherein the red phosphorus is coated with a thermosetting resin.

6. The liquid-crystalline resin composition as claimed in claim 1, which further contains from 5 to 200 parts by weight of an inorganic filler relative to 100 parts by weight of said liquid-crystalline resin composition of claim 1.

7. The liquid-crystalline resin composition as claimed in claim 1, wherein said semi-aromatic liquid-crystalline polyester is has structural units selected from the group consisting of (I), (III) and (IV), and structural units of the following (I), (II), (III) and (IV):

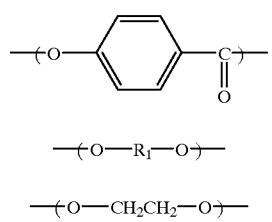

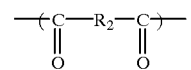

where $R_1$ represents one or more groups selected from the group consisting of the following

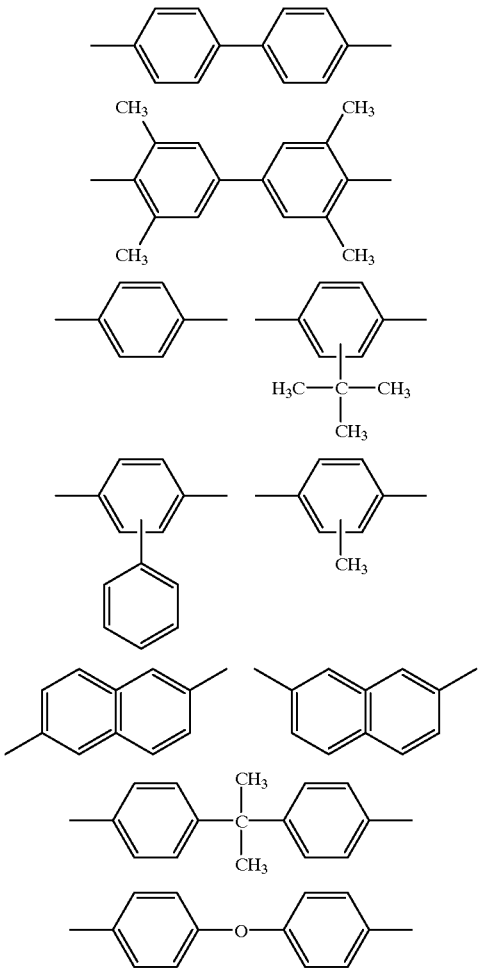

$R_2$ represents one or more groups selected from the group consisting of the following:

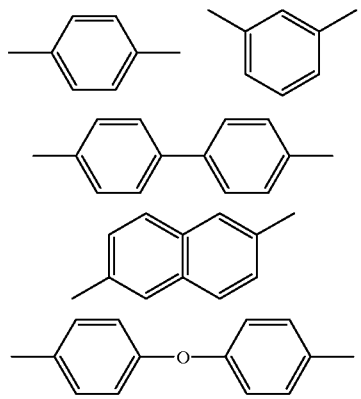

-continued

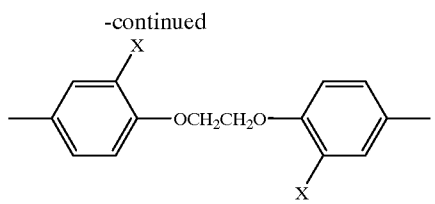

X represents a hydrogen atom or a chlorine atom; and the total of the structural units (II) and (III) is substantially equimolar to the structural units (IV).

8. The liquid-crystalline resin composition as claimed in claim 1, which further contains from 0.01 to 20 parts by weight of a metal oxide relative to 100 parts by weight of a polymer selected from the group consisting of semi-aromatic liquid-crystalline polyester and semi-aromatic liquid-crystalline polyester-amide.

9. The liquid-crystalline resin composition as claimed in claim 8, wherein said metal oxide is selected from the group consisting of cadmium oxide, zinc oxide, cuprous oxide, cupric oxide, ferrous oxide, ferric oxide, cobalt oxide, manganese oxide, molybdenum oxide, tin oxide and titanium oxide.

10. The liquid-crystalline resin composition as claimed in claim 8, wherein said metal oxide is selected from the group consisting of cuprous oxide, cupric acid and titanium oxide.

11. A method for producing a liquid-crystalline resin composition, comprising adding to a polymer selected from the group consisting of a semi-aromatic liquid-crystalline polyester and a semi-aromatic liquid-crystalline polyester-amide, at least one or more compounds of phosphorous acid, hypophosphorous acid and their metal salts in an amount of from 0.001 to 5 parts by weight relative to 100 parts by weight of said polymer, and adding thereto red phosphorus in an amount of from 0.01 to 10 parts by weight relative to the same after the completion of the polymerization.

12. A resin molding produced by molding the liquid-crystalline resin composition of claim 1.

13. The resin molding as claimed in claim 12, which is of a size for use in electric and electronic elements.

* * * * *